(12) United States Patent
Bostick et al.

(10) Patent No.: US 9,440,351 B2
(45) Date of Patent: Sep. 13, 2016

(54) CONTROLLING THE OPERATIONS OF A ROBOTIC DEVICE

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/528,102

(22) Filed: Oct. 30, 2014

(65) Prior Publication Data

US 2016/0121482 A1     May 5, 2016

(51) Int. Cl.
*B25J 9/00* (2006.01)
*G06F 1/16* (2006.01)
(Continued)

(52) U.S. Cl.
CPC .......... *B25J 9/0003* (2013.01); *B25J 9/16* (2013.01); *G06F 1/163* (2013.01); *G01S 17/023* (2013.01); *G01S 19/47* (2013.01); *G05D 1/0016* (2013.01); *Y10S 901/01* (2013.01)

(58) Field of Classification Search
CPC ........ B25J 9/16; B25J 9/1689; B25J 9/1697; B25J 5/007; B25J 11/009; G01S 17/023; G01S 19/47; G05D 1/0016; G05D 1/0022; G05D 2201/0215; G05D 2201/0203; G05D 2201/0211; G05D 2201/0206; G06F 1/163; G06F 1/014; G06F 3/017; G06F 3/0346; G06K 9/0335; G06K 9/0355; G06K 9/22; G06K 9/222; G06K 9/224
See application file for complete search history.

(56) References Cited

U.S. PATENT DOCUMENTS 8,606,404 B1* 12/2013 Huffman ................ B25J 9/1697
                                                         700/259
2005/0200325 A1* 9/2005 Kim ....................... G08C 23/04
                                                         318/568.12

(Continued)

FOREIGN PATENT DOCUMENTS

DE        10215167 C1    6/2003
JP       2005277129 A   10/2005

(Continued)

OTHER PUBLICATIONS

P. Mell et al., "The NIST Definition of Cloud Computing", National Institute of Standards and Technology, Information Technology Laboratory, Version 15, Oct. 7, 2009, pp. 1-2.

(Continued)

*Primary Examiner* — Dale Moyer
(74) *Attorney, Agent, or Firm* — John R. Pivnichny; Law Office of Jim Boice

(57) ABSTRACT

A method and/or computer program product controls operations of a robotic device. A robotic device receives a first signal from a positioning hardware device that is worn by a user. The first signal describes a relative location between the user and the robotic device. A second signal describes an angle between the user and the robotic device and between the user and the user-selected object. Based on the first signal, the second signal, and a record of object positions of objects within a predefined area of the user, the identification and location of the user-selected object is determined. A determination is made regarding whether or not the robotic device is authorized to perform a specific task on the user-selected object based on the location of the user-selected object. If authorized, the robotic device performs the specific task on the user-selected object.

13 Claims, 6 Drawing Sheets

(51) Int. Cl.
*G05D 1/00* (2006.01)
*B25J 9/16* (2006.01)
*G01S 19/47* (2010.01)
*G01S 17/02* (2006.01)

(56) References Cited

U.S. PATENT DOCUMENTS

| | | | | |
|---|---|---|---|---|
| 2007/0057840 | A1* | 3/2007 | Thomas | F41G 3/02 |
| | | | | 342/357.34 |
| 2010/0023185 | A1* | 1/2010 | Terwelp | G01S 17/023 |
| | | | | 701/2 |
| 2010/0103106 | A1 | 4/2010 | Chui et al. | |
| 2012/0185095 | A1 | 7/2012 | Rosenstein et al. | |
| 2012/0268580 | A1 | 10/2012 | Kim et al. | |
| 2013/0317648 | A1* | 11/2013 | Assad | B25J 9/1694 |
| | | | | 700/258 |
| 2013/0325244 | A1 | 12/2013 | Wang et al. | |
| 2015/0032260 | A1* | 1/2015 | Yoon | A47L 9/2857 |
| | | | | 700/257 |

FOREIGN PATENT DOCUMENTS

| | | |
|---|---|---|
| KR | 20130040062 A | 4/2013 |
| WO | 2012149501 A2 | 11/2012 |

OTHER PUBLICATIONS

F. Nebout, K. Taylor, and S. Mendis, "Gesture based interface for robot control," in Asia Pacific Computer Human Interaction (APCHI-2010). Udayana University: Indonesian Ergonomics Society, Aug. 2010, pp. 1-7.

Anonymous, "Samsung Galaxy GearTM Jet Black" Samsung Electronics, www.samsung.com, retrieved Oct. 29, 2014, pp. 1-6.

Anonymous, "Domestic Robots", SwanRobotics, www.swanrobotics.com, retrieved Aug. 12, 2014, pp. 1-3.

Anonymous, "Personal & Domestic Robots", RobotShop Distribution Inc., www.robotshop.com, retrieved Aug. 12, 2014, pp. 1-5.

Anonymous, "Domestic Robot", Wikimedia Foundation, Inc., www.wikipedia.org, retrieved Aug. 12, 2014, pp. 1-4.

M. Correa et al., "Real-Time Hand Gesture Recognition for Human Robot Interaction", Springer-Verlag, RoboCup 2009, LNI 5949, 2010, pp. 46-57.

M. Van Den Bergh et al., "Real-time 3D Hand Gesture Interaction with a Robot for Understanding Directions from Humans", IEEE, RO-MAN, 2011, pp. 357-362.

D. Droeschel et al; "Towards joint attention for a domestic service robot-person awareness and gesture recognition using time-of-flight cameras." In Robotics and Automation (ICRA), 2011 IEEE International Conference on, pp. 1205-1210. IEEE, 2011.

D. Droeschel et al; "Learning to interpret pointing gestures with a time-of-flight camera." In Proceedings of the 6th international conference on Human-robot interaction, pp. 481-488. ACM, 2011.

M. Strobel et al; "Gesture recognition in a spatial context for commanding a domestic service robot", In Proc of the 33rd international symposium on robotics, 2002, pp. 1-5.

M. Buss et al; "Towards proactive human-robot interaction in human environments", In Cognitive Infocommunications (CogInfoCom), 2011 2nd International Conference on, pp. 1-6, IEEE, 2011.

* cited by examiner

CONTROLLING THE OPERATIONS OF A ROBOTIC DEVICE

BACKGROUND

The present disclosure relates to the field of robotic devices, and in particular to the field of controlling the operation of robotic devices. Still more particularly, the present invention is related to controlling which operation is performed on particular objects by robotic devices.

A robotic device is a mechanical device that is designed to perform one or more tasks. Examples of robotic devices include, but are not limited to, robots used in manufacturing, maintenance, personal services, etc.

SUMMARY

In one embodiment of the present invention, a robotic device comprises: a user/robot positioning transceiver, wherein the user/robot positioning transceiver identifies a relative distance and direction between the robotic device and a positioning hardware device that is worn by a user from a first signal; a user/object position receiver, wherein the user-object position receiver receives a second signal from the positioning hardware device that is worn by the user, wherein the second signal indicates that the user is pointing at a user-selected object, wherein the second signal comprises a description of a horizontal angle formed by a first line between the user and the robotic device and a second line between the user and the user-selected object while the user is pointing at the user-selected object, and wherein the second signal further comprises a description of a vertical spatial inclination of the positioning hardware device while the user is pointing at the user-selected object; an object identification/location determination hardware that determines an identification and location of the user-selected object based on the first signal, the second signal, and a record of object positions of objects within a predefined area of the user; a robot/object determination hardware that determines a direction and distance from the robotic device to the user-selected object, wherein the direction and distance from the robotic device to the user-selected object is derived from the first signal, the second signal, and the record of object positions of objects within a predefined area of the user; and an authorization hardware device for determining whether the robotic device is authorized to perform a specific task on the user-selected object, wherein, in response to the authorization hardware device determining that the robotic device is authorized to perform the specific task on the user-selected object, the robotic device is directed to traverse the direction and distance from the robotic device and the user-selected object and to perform the specific task on the user-selected object.

In one embodiment of the present invention, a method and/or computer program product controls the operation of a robotic device. A robotic device receives a first signal from a positioning hardware device that is worn by a user, wherein the first signal describes a first relative location between the user and the robotic device, wherein the first relative location comprises a distance and direction between the user and the robotic device. The robotic device receives a second signal from the positioning hardware device that is worn by the user, wherein the second signal indicates that the user is pointing at a user-selected object, wherein the second signal comprises a description of a horizontal angle formed by a first line between the user and the robotic device and a second line between the user and the user-selected object while the user is pointing at the user-selected object, and wherein the second signal further comprises a description of a vertical spatial inclination of the positioning hardware device while the user is pointing at the user-selected object. One or more processors, determine an identification and location of the user-selected object based on the first signal, the second signal, and a record of object positions of objects within a predefined area of the user. One or more processors determine a direction and distance from the robotic device to the user-selected object, wherein the direction and distance from the robotic device to the user-selected object is derived from the first signal, the second signal, and the record of object positions of objects within a predefined area of the user. One or more processors determine whether the robotic device is authorized to perform a specific task on the user-selected object. In response to determining that the robotic device is authorized to perform the specific task on the user-selected object, the robotic device traverses the direction and distance from the robotic device and the user-selected object, and performs the specific task on the user-selected object.

DETAILED DESCRIPTION

Figure 1:
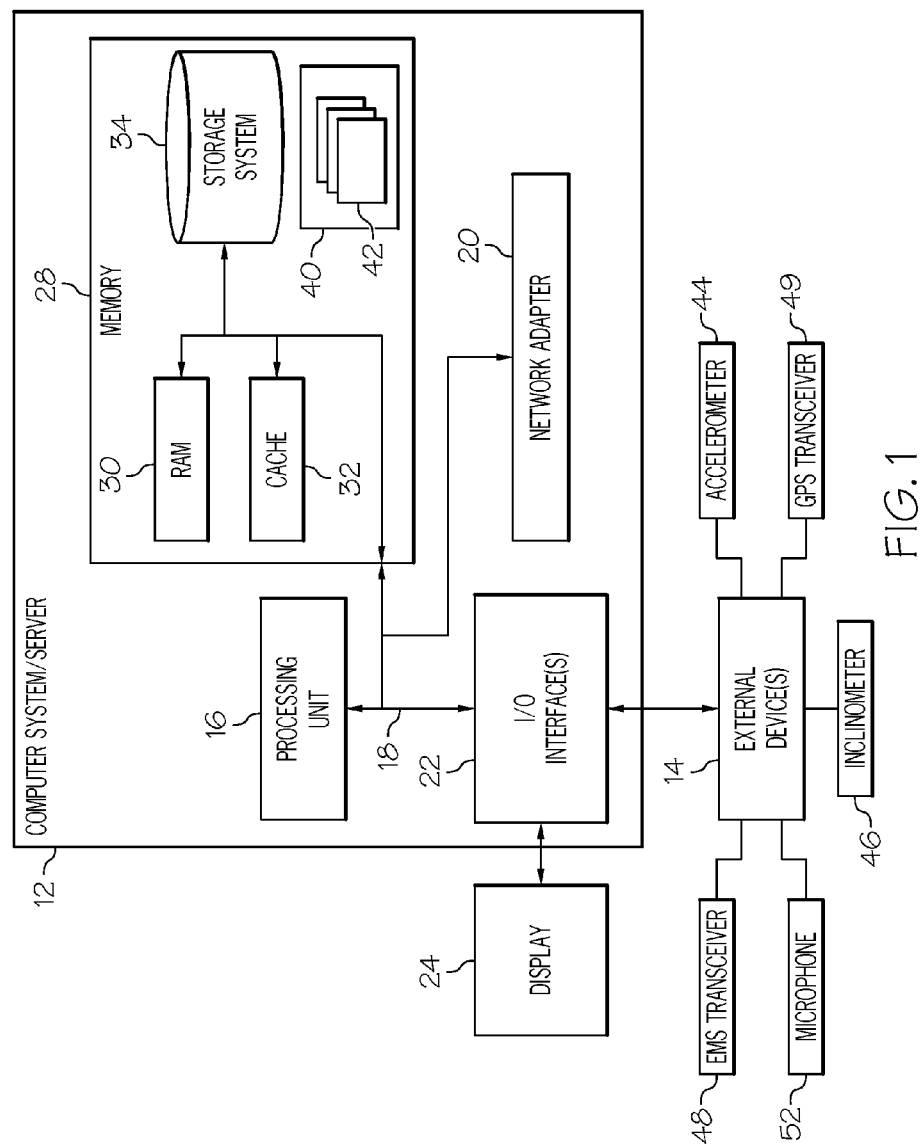
FIG. 1 depicts a cloud computing node according to an embodiment of the present invention.

In one or more embodiments, the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

External devices 14 that can utilize the computer system/server 12 shown in FIG. 1 include, but are not limited to, the robotic device 406 depicted in FIG. 4 below.

Figure 2:
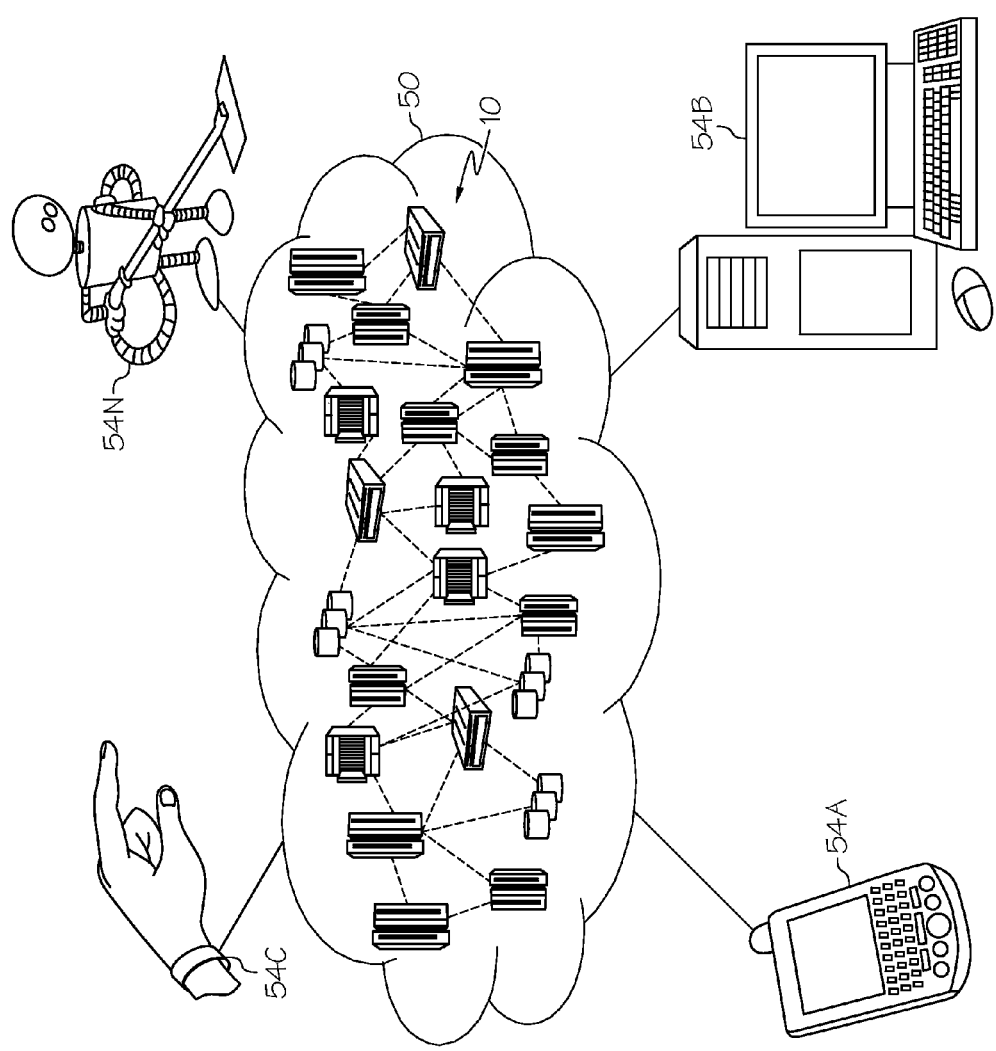
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, a positioning hardware device 54C, and/or a robotic device MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
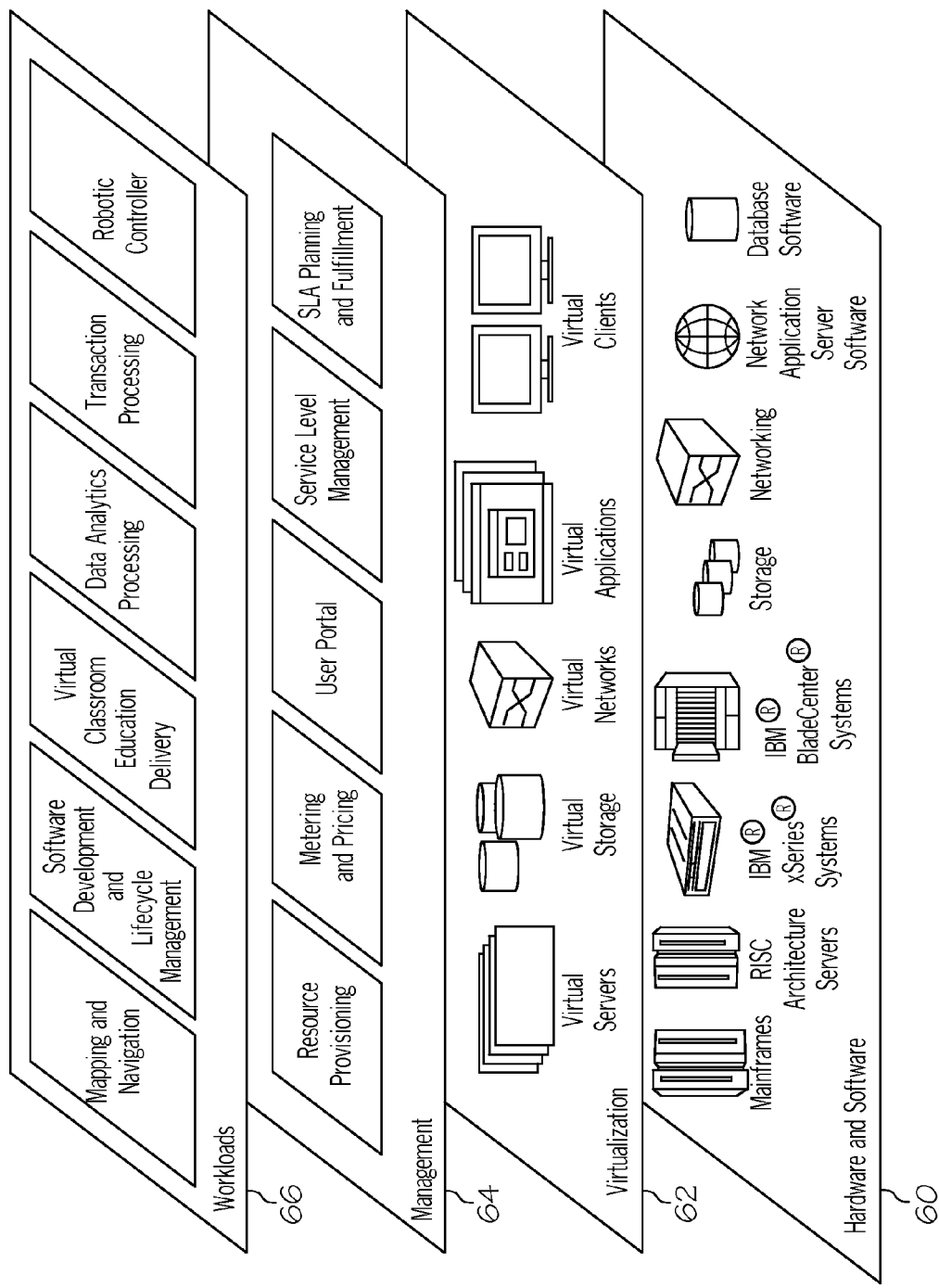
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and controlling operations of a robotic device, as described herein, and as represented by the "Robotic Controller" found in workloads layer 66.

Figure 4:
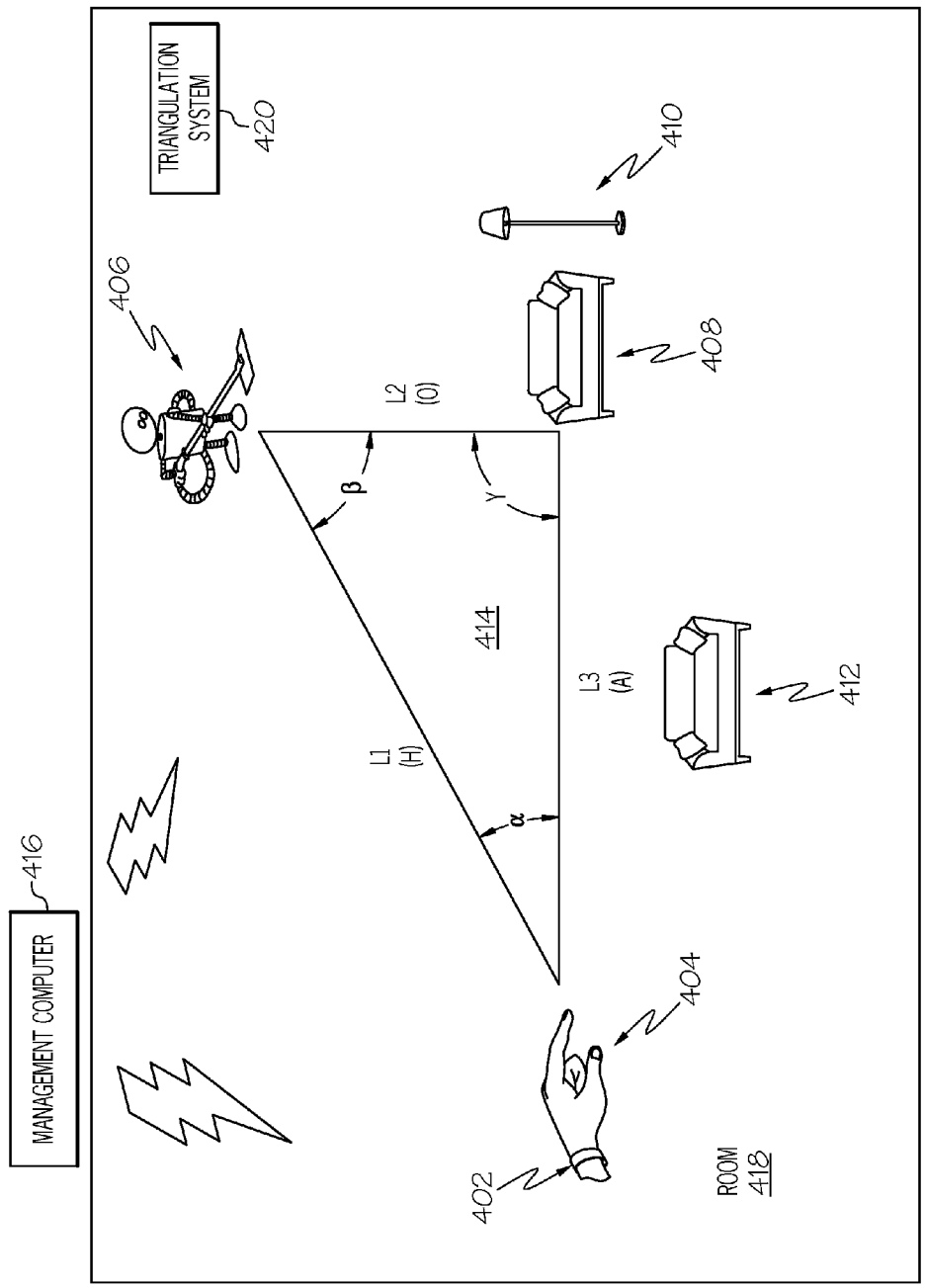
FIG. 4 illustrates an exemplary scenario, for directing a robotic device to a user-selected object in order to perform a specific task, in which a user, the robotic device, and the user-selected object are located at apexes of a right-triangle.

With reference now to FIG. 4, an exemplary scenario, for directing a robotic device to a user-selected object in order to perform a specific task, in which a user, the robotic device, and the user-selected object are located at apexes of a right-triangle is presented. Assume that an area includes a positioning hardware device 402, which is worn by a user 404. Assume further that the user 404 wants a robotic device 406 to perform a task on a user-selected object, such as the depicted couch 408. Thus, in the scenario depicted in FIG.

4, the user 404 wants the robotic device 406, which is capable of cleaning with a vacuum cleaner, to perform the task of cleaning the couch 408, to which the user 404 is pointing. However, the user 404 is also pointing at a lamp 410, which is not what the user 404 wants to be cleaned with the vacuum cleaner operated by the robotic device 406. Similarly, the user is not interested in the robotic device 406 cleaning the couch 412, which is near the user 404, but to which the user 404 is not actually pointing towards. In an embodiment, if the robotic device starts moving towards and/or cleaning couch 412, then the user 404 will present a counter-command (e.g., "other couch"), instructing the robotic device 406 to proceed towards and clean couch 408.

In order to ensure that the robotic device 406 knows exactly what the user 404 intended when he/she pointed at the couch 408 (and then subsequently issued a command, verbally or otherwise, to the robotic device 406 to "clean the couch"), the present invention utilizes two novel features.

First, the present invention utilizes an angular relationship between the user 404, the robotic device 406, and the couch 408. As such, the present invention does not rely on range finders, Radio Frequency Identifier (RFID) chip sensors, etc. to identify the couch 408. That is, the present invention does not rely on an identification device (e.g., an RFID chip) being affixed to the couch 408 in order to identify it, nor does the present invention rely on a range finder (e.g., an infrared transceiver that measures distances based on electromagnetism reflection time) that measures the distance from the user 404 to the couch 408. Rather, the present invention presents a new and useful improvement over the prior art that requires only an angular relationship between a user 404, the robotic device 406, and the couch 408 (i.e., user-selected object), plus a record of where certain objects (and/or types of objects) are located within the room (i.e., a predefined area around the user 404). As described herein, the final determination of the location of the couch 408 is derived from the angle α in the triangle 414 and a record of object positions of objects within a predefined area of the user 404.

Continuing with the description of FIG. 4, assume that the user 404 wants the robotic device 406 to clean the couch 408 with its vacuum cleaner. This requires two types of information. The first is an instruction on what task the user 404 wants the robotic device 406 to perform. This can be transmitted from the user 404 to the robotic device 406 in a variety of manners. For example, assume that the robotic device 406 is equipped with a computing node 10 shown in FIG. 1. Assume further that the positioning hardware device 402 that is worn by the user 404 also is equipped with some or all of the components shown for computing node 10 in FIG. 1. As such, both the robotic device 406 and the positioning hardware device 402 are equipped with an electromagnetic signal (EMS) transceiver 48. The EMS transceiver 48 is able to exchange a radio frequency (RF) signal, an infrared (IR) signal, or any other electromagnetic signal, visible or invisible, between the robotic device and the positioning hardware device 402. As such, the positioning hardware device 402 is able to transmit a coded message (e.g., of a certain frequency, pulse code, containing a digital data packet, etc.) to the robotic device 406 instructing the robotic device 406 to perform a certain task (e.g., "clean the object with a vacuum cleaner").

Similarly, the robotic device 406 may be equipped with a microphone 52 (as shown in FIG. 1), which allows the robotic device 406 to receive verbal commands from the user 404. For example, if the user 404 says "clean the couch", the microphone 52 converts this voice command into an analog signal, which is digitized and recognized by the processing unit 16 shown in FIG. 1. The robotic device 406 now knows that it is to "clean the couch", but it doesn't know yet which couch or where the couch is located.

Rather than require the robotic device 406 to utilize expensive, slow, and often inaccurate image recognition logic, the present invention directs the robotic device 406 to the user-selected couch 408 by a combination of angular relationships and a record of object locations. The positioning hardware device 402 shown in FIG. 4 includes a set of 3-dimensional positioning devices. Examples of such 3-dimensional positioning devices include, but are not limited to, a inclinometer 46 (shown in FIG. 1) that uses gravity to indicate the angle of the positioning hardware device 402 relative to the floor; an accelerometer 44 that measures acceleration of the positioning hardware device 402 to identify the position of the positioning hardware device 402; and/or a Global Positioning System (GPS) transceiver 49, which uses GPS satellite signals to indicate a particular location of the positioning hardware device. Using such 3-dimensional positioning devices, the positioning hardware device 402 is able to establish line L3 when the user 404 points at the couch 408. However, at this point, the length of L3 has not yet been established.

Since the positioning hardware device 402 and the robotic device 406 are both equipped with the EMS transceiver 48 shown in FIG. 1, then the positioning hardware device 402 is also able to define line L1 between the positioning hardware device 402 and the robotic device 406. That is, the positioning hardware device 402 "knows" where it is according to the 3-dimensional positioning devices (described above) within the positioning hardware device 402, and the robotic device 406 "knows" where it is according to the 3-dimensional positioning devices within the robotic device 406. By transmitting a distance signal between the positioning hardware device 402 and the robotic device 406 (e.g., with a range finder), the position and length of L1 are established. Thus, angle α is now established.

As mentioned above, the length of L3 is initially unknown, since the user is pointing the positioning hardware device 402 along line L3. However, also along line L3 is a lamp 410, which the user does not want to be cleaned with a vacuum cleaner (lest it be damaged). In order to define the length of L3, the positioning hardware device 402, robotic device 406, and/or a management computer 416 (having the architecture of one or more components of the computing node 10 shown in FIG. 1 and being in wireless communication with the positioning hardware device 402 and/or the robotic device 406) retrieve a record (e.g., from memory 28 shown in FIG. 1) of object locations within a predefined area of the user 404 that can be cleaned with a vacuum cleaner. That is, assume that memory 28 has a record of the physical location of couch 408 and lamp 410 within room 418. Both couch 408 and lamp 410 are along the line of direction established by line L3 (which was created by the user 404 aiming the positioning hardware device 402 at the couch 408). The couch 412, however, is not along the line of line L3, and thus is not a candidate for cleaning.

Creation of the record of physical locations of objects within a predefined area (e.g., room 418) can be established in various ways. In an embodiment, a triangulation system 420 within the room 418 has multiple pointers (not shown). That is, the triangulation system 420 has pointers located at various positions about room 418. A temporary receiver is placed on each item (e.g., couch 408), which reflects back signals from the pointers within the triangulation system 420. These reflected-back signals are then integrated to create the record of object positions stored in the memory 28 in FIG. 1.

In an embodiment, the positions of the objects within room 418 are indicated by a user entering the positions of each of the objects on a map on a user interface, which is then integrated into the record of object locations. That is, the user interface includes a grid description of room 418. By placing an icon indicating each particular object at a particular grid intersection, then the location of that particular object is generated for storage in the record of object locations.

In an embodiment, the positions of the object within room 418 are established by a set of floor sensors. For example, assume that the floor of room 418 contains a grid of pressure sensors. As a particular object is placed on the floor, the sensors detect its weight. By comparing this weight to a lookup table of objects, the object itself can be identified. For example, the lookup table may contain information indicating that anything weighing between 150 and 155 pounds is a couch, while anything weighing between 5 and 7 pounds is a lamp. When the floor sensors detect an object weighing 152 pounds, then that object is identified as a couch, and its location is that of the grid intersection on the floor.

In various embodiments, the record from memory 28 includes not only where couch 408 and lamp 410 are physically located within room 418, but also includes information related to whether or not it is appropriate to vacuum clean the couch 408 and/or lamp 410 at the present time.

In various embodiments of the present invention, determining whether or not it is appropriate to perform a certain task on a particular object depends on various parameters (or combinations thereof). For example, the type of object may be dispositive of the question. That is, if a tag/field in the record indicates that object is appropriate for vacuum cleaning, then any object in the direction of line L3 will be vacuum cleaned. In the example in FIG. 4, couch 408 meets this criteria, but lamp 410 does not (since vacuum cleaning a lamp would likely damage the lamp).

In another embodiment, a history of cleaning may determine which object is being selected by the user 404. For example, a record may show that robotic device 406 has vacuum cleaned couch 408 in the past. This alone may be enough to identify couch 408 as the intended object to be cleaned. In other embodiments, the record may include a record of when the couch 408 was last cleaned, when the couch is scheduled to be cleaned next, etc. This record of when the couch 408 has been (or is scheduled to be) cleaned may identify the couch 408 as what the user 404 wants to be cleaned. Other information from the records found in memory 28 are described herein.

Continuing with the example of FIG. 4, the location of user 404, robotic device 406, and couch 408 have now been established. More specifically, the length and direction of L1, the length and direction of L3, and angle α have been established. If angle γ of resulting triangle 414 is a 90° right angle (as depicted in FIG. 4), then establishing angle β is and the length of L2 (and thus the direction and distance that the robotic device 406 must traverse to reach the couch 408) is established by:

$$\beta = 180° - \gamma - \alpha = 180° - 90° - \alpha = 90° - \alpha$$

$$L2 = \sin \alpha \times L1$$

Thus, assume that α is 30°, the β is 90°−30°=60° (from line L1 to the user 404).

Continuing to assume that α is 30°, the length of L2 (the "opposite" side of triangle 414) is derived from the length of L1 (the hypotenuse of triangle 414, which for example has been determined to be 10' by the rangefinder between the positioning hardware device 402 and the robotic device 406) by:

$$L2 = \sin \alpha \times L1 = \sin 30° \times 10' = 0.5 \times 10' = 5'.$$

Thus, the robotic device 406 knows that it must travel 5', in a direction that is 60° counterclockwise from line L1 in order to reach couch 408. As the location of couch 408 has been established by the record of object locations in the memory 28, there is no need for any type of electronic identifier (e.g., an RFID chip) to be affixed to the couch 408, nor does the robotic device need to utilize any type of image recognition system, range finder, etc. to move to the couch 408. Rather, the location of the couch 408 is established just by the direction in which the positioning hardware device 402 is pointing, the relative positioning between the positioning hardware device 402 and the robotic device 406, and the record of object locations of objects within the room 418. This enables a system that is highly precise, without requiring any modifications to the couch 408 itself.

Figure 5:
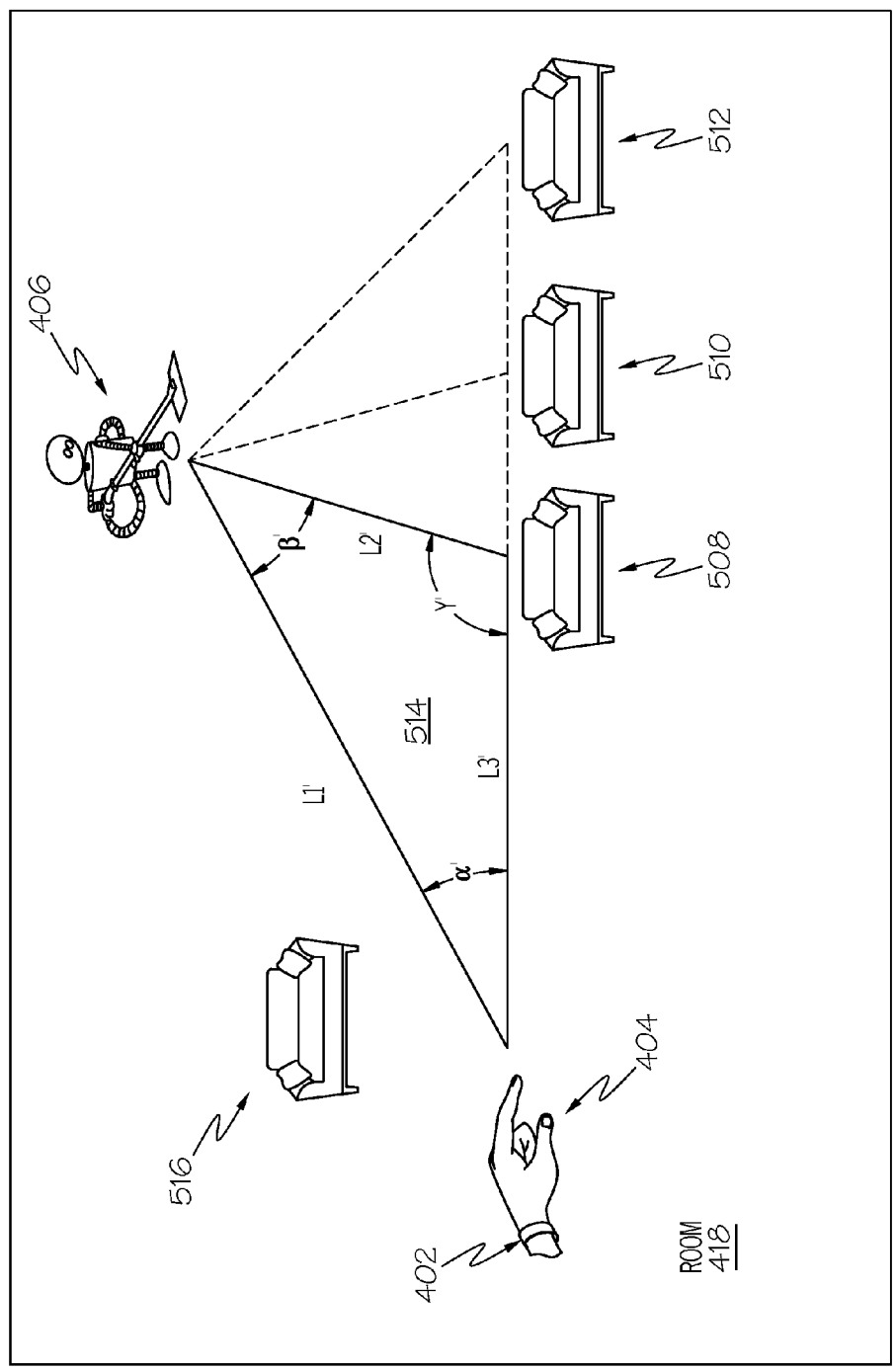
FIG. 5 depicts an exemplary scenario, for directing a robotic device to a user-selected object in order to perform a specific task, in which a user, the robotic device, and the user-selected object are located at apexes of a triangle that has no 90° right angle.

While the system has been described for ease of understanding in FIG. 4 as a scenario in which a right-triangle describes the relative positions of the user 404, the robotic device 406, and the couch 408, in other embodiments this relationship is described by a triangle that is not a right triangle, but rather is an oblique triangle (not having a 90° angle). Thus, FIG. 5 depicts an exemplary scenario, for directing a robotic device to a user-selected object in order to perform a specific task, in which a user, the robotic device, and the user-selected object are located at apexes of a triangle that has no 90° right angle. As in FIG. 4, the user is not pointing at couch 516, which is thus ignored. However, the user 404 is now pointing to multiple couches 508, 510, and 512. Thus, three issues are to be resolved in FIG. 5: 1) which couch is to be cleaned; and 2) the size of angle β'; and 3) the length of L2'.

In FIG. 5, L1' and angle α' are derived in the manner described in FIG. 4 for deriving L1 and angle α. However, unlike angle γ in FIG. 4, angle γ' in FIG. 4 is not a right triangle. Thus, the trigonometry described in FIG. 4 will not work. Rather, oblique trigonometry must be used. For example, in order to derive the length of L3', the lookup table of objects that are to be acted upon (or not acted upon) is first consulted. As indicated in FIG. 5, there are three couches 508, 510, and 512. However, the lookup table described above indicates that, based on past cleaning histories, couch 508 is deemed to be the only couch that is due for (or has a history of) cleaning. As the lookup table has a record of where couch 508 is located in room 418, and since the positioning hardware device 402 has hardware that defines its location, then L3' is known. Thus, to define the length of L2', the following formula is used:

$$(L2')^2 = (L1')^2 + (L3')^2 - 2(L1')(L3') \cos \alpha'$$

More specifically, in order to determine the length of L2', assume that α' is 30°, L1' is 10', and L3' is 8'. The formula thus becomes:

$$L2' = \sqrt{((L1')^2 + (L3')^2 - 2(L1')(L3') \cos \alpha')}$$

$$L2' = \sqrt{(10^2 + 8^2 - 2(10)(8) \cos 30°)}$$

$$L2' = \sqrt{(100 + 64 - 2(10)(8) 0.866)}$$

$$L2' = \sqrt{(164 - 138)}$$

$L2'=\sqrt{26}$ $L2'=5.099'$

Knowing the value for L1' (10—from the hardware found in positioning hardware device 402 and robotic device 406), a' (30°—from the hardware found in positioning hardware device 402 and robotic device 406), and the value of L3' (8—using the lookup table as described above), then the angle β' can be derived from the law of sines. Specifically, the formula used in an embodiment is:

$$\frac{\sin\beta'}{L3'} = \frac{\sin\alpha'}{L2'}$$

$$\frac{\sin\beta'}{8} = \frac{\sin 30°}{5.099}$$

$$\sin\beta' = \frac{\sin 30°}{5.099} \times 8 = \frac{0.5}{5.099} = 0.7844$$

Thus, B'=sin$^{-1}$(0.7844)=51.67°

Therefore, the robotic device 406 knows to travel 5.099' (L2') in a direction that is 51.67° counterclockwise to L1' in order to reach couch 508.

As described in FIG. 1 and FIG. 4 and FIG. 5, one or more embodiments of the present invention are for a robotic device 406. One component of the robotic device 406 is a user/robot positioning transceiver, such as the EMS transceiver 48 shown in FIG. 1. This user/robot positioning transceiver identifies a relative distance and direction (e.g., L1 and β in FIG. 4) between the robotic device 406 and a positioning hardware device 402 that is worn by a user 404 from a first signal from the positioning hardware device 402.

The robotic device 406 also has a user/object position receiver (e.g., the same or another embodiment of the EMS transceiver 48 shown in FIG. 1). This user-object position receiver receives a second signal from the positioning hardware device 402 that is worn by the user 404. This second signal indicates that the user 404 is pointing at a user-selected object (e.g., couch 408 in FIG. 4). This second signal also includes a description of a horizontal angle (a in FIG. 4) formed by a first line between the user and the robotic device (L1 in FIG. 4) and a second line between the user and the user-selected object (L3 in FIG. 4) while the user is pointing at the user-selected object. The second signal also contains a description of a vertical spatial inclination of the positioning hardware device while the user is pointing at the user-selected object. This vertical spatial inclination information is derived from an inclinometer (e.g., inclinometer 46 in FIG. 1) that registers the angle away from horizontal at which the positioning hardware device 402 is aimed. That is, just knowing the values of L1, L3, and α only provides some of the information needed for telling the robotic device 406 what object is to be attended to. For example, two or more objects may be stacked or shelved on top of one another. Thus, the vertical spatial inclination of the positioning hardware device is needed to identify which of the stacked objects are being selected by the user. Similarly, the user-selected object may be a single item (e.g., couch 408), but the user may want only the top half (i.e., back cushions) of the couch 408 to be cleaned. This identification is made with information from the vertical spatial inclination of the positioning hardware device 402.

The robotic device also includes an object identification/location determination hardware, which may utilize processing unit 16 in FIG. 1. The object identification/location determination hardware determines an identification and location of the user-selected object (e.g., couch 408) based on the first signal, the second signal, and a record of object positions of objects within a predefined area of the user. This record of object positions may be generated by spatial sensors, weight sensors on a floor grid, etc. as described above.

The robotic device also includes a robot/object determination hardware, which may utilize processing unit 16 in FIG. 1. The robot/object determination hardware determines a direction and distance from the robotic device to the user-selected object, using the formulas described above. The direction and distance from the robotic device to the user-selected object is derived from the first signal, the second signal, and the record of object positions of objects within a predefined area of the user (e.g., within room 418 in FIG. 4).

The robotic device also includes an authorization hardware device, which may utilize processing unit 16 in FIG. 1. The authorization hardware device determines whether the robotic device is authorized to perform a specific task on the user-selected object. In response to the authorization hardware device determining that the robotic device is authorized to perform the specific task on the user-selected object, the robotic device is directed to traverse the direction and distance from the robotic device and the user-selected object, and to perform the specific task on the user-selected object.

In an embodiment of the present invention, the authorization hardware device determines whether the robotic device is authorized to perform the specific task on the user-selected object by examining a record of tasks that have been performed on the user-selected object. This record of tasks includes a record of when the specific task was last performed on the user-selected object. In response to determining that the specific task was last performed on the user-selected object more than a predefined past length of time, the authorization hardware device determines that the robotic device is authorized to perform the specific task on the user-selected object. For example, if the couch 408 has not been vacuum cleaned for over a week, then the robotic device 406 may be authorized to vacuum clean it.

In an embodiment of the present invention, the authorization hardware device determines whether the robotic device is authorized to perform the specific task on the user-selected object by examining a record of tasks that have been performed on the user-selected object, where the record of tasks comprises a record of which tasks have been performed by the robotic device on the user-selected object. In response to determining that the robotic device has performed the specific task on the user-selected object in the past, then the authorization hardware device determines that the robotic device is authorized to perform the specific task on the user-selected object. For example, if the robotic device 406 in FIG. 4 has ever vacuum cleaned the couch 408 in the past, then it is deemed to be authorized to do so again.

In an embodiment of the present invention, the authorization hardware device determines whether the robotic device is authorized to perform the specific task on the user-selected object by examining a record of object locations of objects that have been acted upon by the robotic device at a past time. In response to determining that the robotic device has performed the specific task on an object at a particular object location from the record of object locations of objects that have been acted upon by the robotic device at the past time, the authorization hardware device determines that the robotic device is authorized to perform the specific task on the user-selected object at the particular object location. For example, if the robotic device 406 in FIG. 4 has cleaned couch 408 at a certain location within room 418, and the couch 408 is still at that same location, then the authorization hardware device determines that the robotic device 406 is authorized to clean the couch 408, but only at that certain location.

In an embodiment of the present invention, the authorization hardware device determines whether the robotic device is authorized to perform the specific task on the user-selected object by examining a record of object locations of objects that have been acted upon by the robotic device at a past time, where the record of object locations further comprises a type description of at least one of the objects. The user-selected object is matched to a particular object from the record to determine a type description of the user-selected object. In response to the type description of the user-selected object matching a type description of an object from the record of object locations, the authorization hardware device determines that the robotic device is authorized to perform the specific task on the user-selected object. For example, assume that robotic device 406 has a record of cleaning seat-cushioned furniture. Assume further that couch 408 is on record as being a unit of seat-cushioned furniture. Therefore, the authorization hardware device determines that the robotic device 406 is authorized to vacuum clean couch 408, even if it has never done so before.

In an embodiment of the present invention, the robotic device includes an area hardware receiver (e.g., EMS transceiver 48 in FIG. 1) for receiving a definition of an area that extends around a space occupied by the user-selected object. This area is defined by a movement of the positioning hardware device that is worn by the user, and is populated with the user-selected object and objects other than the user-selected object. For example, a user may move his/her hand around in a circular motion while pointing at the couch 408 in FIG. 4. This circular motion defines an area that includes not only the couch 408, but may also include couch 412. The robotic device also includes a task execution device (which may utilize the processing unit 16 shown in FIG. 1) for executing, by the robotic device, the specific task on any object within the area that extends around the space occupied by the user-selected object. Thus, the robotic device will clean both the couch 408 and the couch 412, due to the area defined by the user moving the positioning hardware device 402 about in a circular motion.

In an embodiment of the present invention, the robotic device includes an area hardware receiver (e.g., EMS transceiver 48 in FIG. 1) for receiving a definition of an area that extends around a space occupied by the user-selected object, where the area is once again defined by a movement of the positioning hardware device that is worn by the user. As in the embodiment just described, the area is populated with the user-selected object and objects other than the user-selected object by the rotating movement of the positioning hardware device 402 on the hand of the user 404. A supplemental object identification/location determination hardware (which may utilize the processing unit 16 in FIG. 1) further determines the identification of the user-selected object based on the user-selected object being scheduled to have the specific task performed thereon and the objects other than the user-selected object failing to be scheduled to have the specific task performed thereon. For example, if moving the positioning hardware device 402 in a circular manner encapsulates an area that includes both couch 408 and couch 412 in FIG. 4, but couch 408 is not scheduled to be cleaned while couch 412 is, then the couch 412 is identified as the user-selected object to be cleaned, while couch 408 is ignored.

While the present invention has been described above in embodiments in which the location of the user-selected object is identified from a predefined lookup table of object location, in one embodiment the location of the user-selected object is determined directly by the positioning hardware device 402. For example, assume that the positioning hardware device 402 includes not only the orientation hardware described above (e.g., the GPS transceiver 49, the accelerometer 44, and the inclinometer 46 shown in FIG. 1), but also includes an electromagnetic rangefinder (e.g., EMS transceiver 48 shown in FIG. 1). This laser rangefinder transmits an electromagnetic signal (e.g., a laser light, an infrared signal, etc.) to the couch 508. This electromagnetic signal is reflected back to the EMS transceiver 48, which calculates the time it took for the signal to reflect back. Based on this time computation, the distance between the positioning hardware device 402 and the couch 508 is determined. Thus, by aiming the positioning hardware device 402 at a user-selected object, such as the couch 508 shown in FIG. 5, the triangle 514 is defined, since the length and orientation of line L3' are now defined. As described above, the length and orientation of line L1', as well as the value of angle α', have been defined by hardware within the positioning hardware device 402 and the robotic device 406. Furthermore, since the exact position of couch 508 is now known, then angle β' as well as angle γ' can also be determined by the positioning hardware device 402 and/or the robotic device 406, since the positions of the positioning hardware device 402, the robotic device 406, and the couch 508 are all known. Thus, the distance from the robotic device 406 to the couch 508 can also be calculated using the formula:

$$\frac{\sin\beta'}{L3'} = \frac{\sin\alpha'}{L2'}$$

Using 5 as the value of L3', 30° as the value of α', and 25° as the value of β', the value of L2' is determined according to the formula:

$$\frac{\sin 25°}{5} = \frac{\sin 30°}{L2'}$$

$$L2' = \frac{\sin 30°}{\sin 25°} \times 5 = \frac{0.5}{0.422} \times 5 = 5.9'$$

Figure 6:
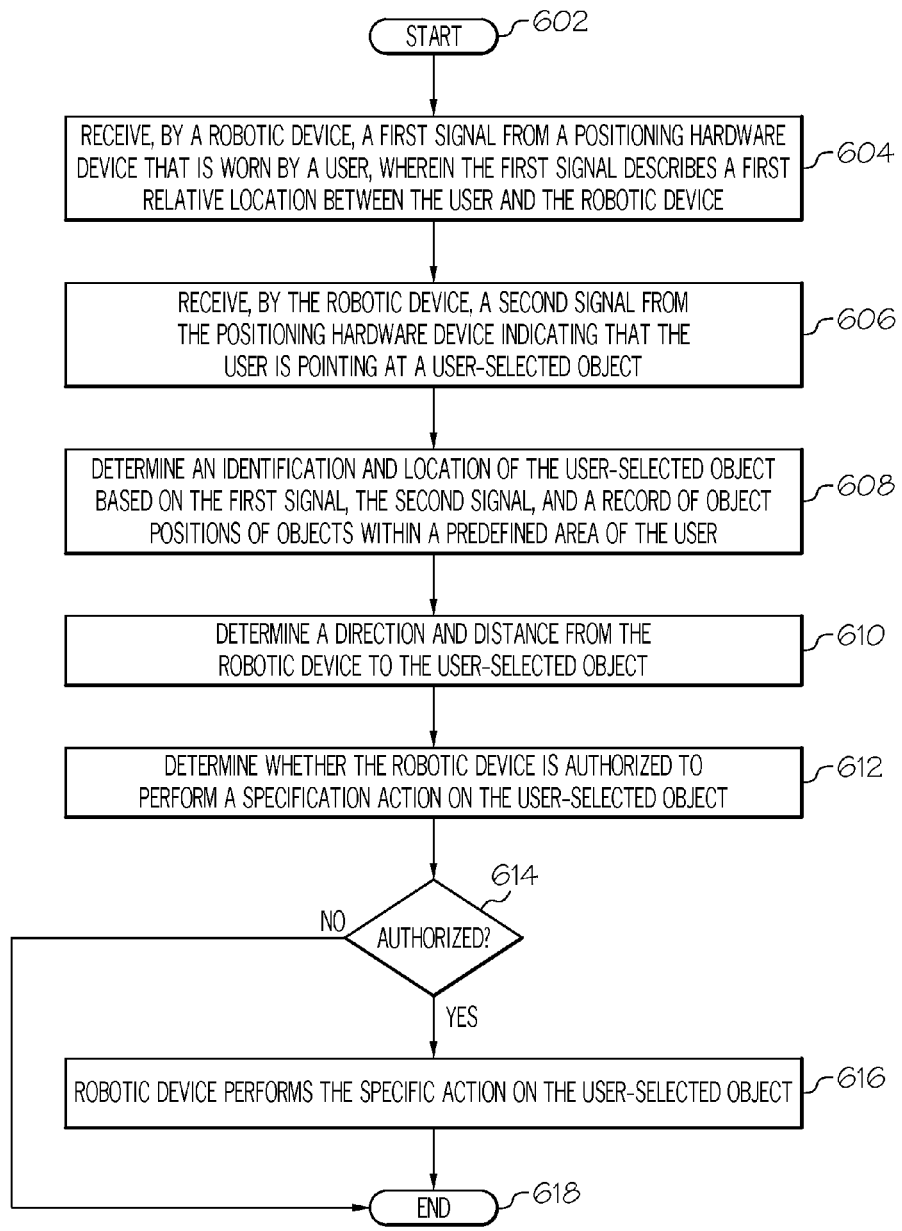
FIG. 6 is a high level flow-chart of one or more operations performed by one or more processors or other hardware devices to control the operation of a robotic device when performing a task on one or more user-selected objects.

With reference now to FIG. 6, a high level flow-chart of one or more operations performed by one or more processors and/or other hardware devices to control the operation of a robotic device when performing a task on one or more user-selected objects is presented. After initiator block 602, a robotic device receives a first signal from a positioning hardware device that is worn by a user (block 604). This first signal describes a first relative location between the user and the robotic device, where the first relative location includes a distance and direction between the user and the robotic device.

As described in block 606, the robotic device receives a second signal from the positioning hardware device that is worn by the user. This second signal indicates that the user is pointing at a user-selected object, and includes a description of a horizontal angle formed by a first line between the user and the robotic device and a second line between the user and the user-selected object while the user is pointing at the user-selected object, as well as a description of a vertical spatial inclination of the positioning hardware device while the user is pointing at the user-selected object. Thus, the second signal provides a three-dimensional orientation between the user and the user-selected object to which he/she is pointing.

As described in block 608, a determination is made of an identification and location of the user-selected object based on the first signal, the second signal, and a record of object positions of objects within a predefined area of the user, using the procedures described herein.

As described in block 610, a determination is made of a direction and distance from the robotic device to the user-selected object. As described by the procedures above, the direction and distance from the robotic device to the user-selected object is derived from the first signal, the second signal, and the record of object positions of objects within a predefined area of the user.

As described in block 612, a determination is made as to whether the robotic device is authorized to perform a specific task on the user-selected object, using the parameters described herein.

A query (query block 614) is made as to whether or not the robotic device is authorized to perform the specific task on the user-selected object. If so, then the robotic device traverses the direction and distance from the robotic device and the user-selected object and performs the specific task on the user-selected object (block 616). The flow-chart ends at terminator block 618.

In an embodiment of the present invention, determining whether the robotic device is authorized to perform the specific task on the user-selected object is achieved by examining, by one or more processors, a record of tasks that have been performed on the user-selected object. This record of tasks includes a record of when the specific task was last performed on the user-selected object. In response to determining that the specific task was last performed on the user-selected object more than a predefined past length of time, a determination is made by one or more processors that the robotic device is authorized to perform the specific task on the user-selected object.

In an embodiment of the present invention, determining whether the robotic device is authorized to perform the specific task on the user-selected object is achieved by examining, by one or more processors, a record of tasks that have been performed on the user-selected object. This record of tasks includes a record of which tasks have been performed by the robotic device on the user-selected object. In response to determining that the robotic device has performed the specific task on the user-selected object at a past time, a determination is made by one or more processors that the robotic device is authorized to perform the specific task on the user-selected object.

In an embodiment of the present invention, determining whether the robotic device is authorized to perform the specific task on the user-selected object is achieved by examining, by one or more processors, a record of object locations of objects that have been acted upon by the robotic device at a past time. In response to determining that the robotic device has performed the specific task on an object at a particular object location from the record of object locations of objects that have been acted upon by the robotic device at the past time, a determination is made by one or more processors that the robotic device is authorized to perform the specific task on the user-selected object at the particular object location.

In an embodiment of the present invention, determining whether the robotic device is authorized to perform the specific task on the user-selected object is achieved by examining, by one or more processors, a record of object locations of objects that have been acted upon by the robotic device at a past time. This record of object locations includes a type description of at least one of the objects. One or more processors match the user-selected object to a particular object from the record to determine a type description of the user-selected object. In response to the type description of the user-selected object matching a type description of an object from the record of object locations, one or more processors determine that the robotic device is authorized to perform the specific task on the user-selected object.

In an embodiment of the present invention, the robotic device receives an area signal that is generated by movement of the positioning hardware device that is worn by the user. The area signal describes a definition of an area that extends around a space occupied by the user-selected object, such that the area is populated with the user-selected object as well as objects other than the user-selected object. The robot device executes the specific task on any object within the area that extends around the space occupied by the user-selected object.

In an embodiment of the present invention, the robotic device receives an area signal that is generated by movement of the positioning hardware device that is worn by the user. This area signal describes a definition of an area that extends around a space occupied by the user-selected object, such that the area is populated with the user-selected object and objects other than the user-selected object. One or more processors further determine (clarify, confirm) the identification of the user-selected object based on the user-selected object being scheduled to have the specific task performed thereon and the objects other than the user-selected object failing to be scheduled to have the specific task performed thereon. For example, if an object within the defined area is scheduled to be serviced, then it is deemed to be the user-selected object. However, if an object within the defined area is not scheduled to be serviced, then it is deemed to not be a user-selected object. In an embodiment, however, even an object that is not deemed to be user-selected can still be cleaned by an overriding instruction ("clean the other couch") from user 404.

In an embodiment of the present invention, the robotic device 406 is instructed to perform a task on an object (e.g., clean couch 408 in FIG. 4) in response to a predefined event occurring at the object. For example, if a camera (connected to management computer 416 in FIG. 4) detects a dog jumping onto couch 408, then the management computer 416 may present an overriding command to the robotic device 406 to immediately clean couch 408, regardless of the schedule/history between the robotic device 406 and the couch 408. In other scenarios, the predefined event may be a leak (if the object is a mechanical object), a fire (if the object is any flammable object that is not intended to be afire), etc. Thus, any anomalous predefined event may trigger the robotic device to perform a specific task on the object.

The current invention has been described using a robotic device that is designed to vacuum clean objects, such as couches. However, the principles described herein, including the identification and location of user-selected objects, extend to other embodiments. For example, a task to be performed by the robotic device may be to retrieve an item from a warehouse. In this example, the robotic device would be a "picker" capable of grabbing/lifting an item and placing it into a bin, etc. Thus, the "grabbing/lifting/placing" is the task being performed on an object (the warehouse item) by the robotic device (the "picker").

In another embodiment, the user-selected object is a piece of equipment; the task is to operate and/or maintain the piece of equipment (e.g., turning on an electrical switch, turning a valve, performing maintenance such lubricating the equipment, etc.); and the robotic device is a movable device (e.g., having auto-mobility by on-board motors, a power supply, etc.) such as a robot with an actuator arm that can perform the task.

Thus, the scope of the present invention in one or more embodiments may extend to any scenario in which a robotic device performs one or more tasks on one or more user-selected physical objects.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for controlling operation of a robotic device, the method comprising:
   receiving, by a robotic device, a first signal from a positioning hardware device that is worn by a user, wherein the first signal describes a first relative location between the user and the robotic device, wherein the first relative location comprises a distance and direction between the user and the robotic device;
   receiving, by the robotic device, a second signal from the positioning hardware device that is worn by the user, wherein the second signal indicates that the user is pointing at a user-selected object, wherein the second signal comprises a description of a horizontal angle formed by a first line between the user and the robotic device and a second line between the user and the user-selected object while the user is pointing at the user-selected object, and wherein the second signal further comprises a description of a vertical spatial inclination of the positioning hardware device while the user is pointing at the user-selected object;
   determining, by one or more processors, an identification and location of the user-selected object based on the first signal, the second signal, and a record of object positions of objects within a predefined area of the user;
   determining, by one or more processors, a direction and distance from the robotic device to the user-selected object, wherein the direction and distance from the robotic device to the user-selected object is derived from the first signal, the second signal, and the record of object positions of objects within a predefined area of the user;
   determining, by one or more processors, whether the robotic device is authorized to perform a specific task on the user-selected object; and
   in response to determining that the robotic device is authorized to perform the specific task on the user-selected object, traversing, by the robotic device, the direction and distance from the robotic device to the user-selected object and performing, by the robotic device, the specific task on the user-selected object.

2. The method of claim 1, wherein said determining whether the robotic device is authorized to perform the specific task on the user-selected object comprises:
   examining, by one or more processors, a record of tasks that have been performed on the user-selected object, wherein the record of tasks comprises a record of when the specific task was last performed on the user-selected object; and
   in response to said examining determining that the specific task was last performed on the user-selected object more than a predefined past length of time, determining, by one or more processors, that the robotic device is authorized to perform the specific task on the user-selected object.

3. The method of claim 1, wherein said determining whether the robotic device is authorized to perform the specific task on the user-selected object comprises:
   examining, by one or more processors, a record of tasks that have been performed on the user-selected object, wherein the record of tasks comprises a record of which tasks have been performed by the robotic device on the user-selected object; and
   in response to said examining determining that the robotic device has performed the specific task on the user-selected object at a past time, determining, by one or more processors, that the robotic device is authorized to perform the specific task on the user-selected object.

4. The method of claim 1, wherein said determining whether the robotic device is authorized to perform the specific task on the user-selected object comprises:

examining, by one or more processors, a record of object locations of objects that have been acted upon by the robotic device at a past time; and in response to said examining determining that the robotic device has performed the specific task on an object at a particular object location from the record of object locations of objects that have been acted upon by the robotic device at the past time, determining, by one or more processors, that the robotic device is authorized to perform the specific task on the user-selected object at the particular object location.

5. The method of claim 1, wherein said determining whether the robotic device is authorized to perform the specific task on the user-selected object comprises:

examining, by one or more processors, a record of object locations of objects that have been acted upon by the robotic device at a past time, wherein the record of object locations further comprises a type description of at least one of the objects;

matching, by one or more processors, the user-selected object to a particular object from the record to determine a type description of the user-selected object; and in response to the type description of the user-selected object matching a type description of an object from the record of object locations, determining, by one or more processors, that the robotic device is authorized to perform the specific task on the user-selected object.

6. The method of claim 1, further comprising:

receiving, by the robotic device, an area signal that is generated by movement of the positioning hardware device that is worn by the user, wherein the area signal describes a definition of an area that extends around a space occupied by the user-selected object, wherein the area is populated with the user-selected object and objects other than the user-selected object; and executing, by the robotic device, the specific task on any object within the area that extends around the space occupied by the user-selected object.

7. The method of claim 1, further comprising:

receiving, by the robotic device, an area signal that is generated by movement of the positioning hardware device that is worn by the user, wherein the area signal describes a definition of an area that extends around a space occupied by the user-selected object, wherein the area is populated with the user-selected object and objects other than the user-selected object; and further determining, by one or more processors, the identification of the user-selected object based on the user-selected object being scheduled to have the specific task performed thereon and the objects other than the user-selected object failing to be scheduled to have the specific task performed thereon.

8. A computer program product for controlling operation of a robotic device, wherein the computer program product comprises a computer readable storage medium having program code embodied therewith, wherein the computer readable storage medium is not a transitory signal per se, and wherein the program code is readable and executable by a processor to perform a method comprising:

receiving, by a robotic device, a first signal from a positioning hardware device that is worn by a user, wherein the first signal describes a first relative location between the user and the robotic device, wherein the first relative location comprises a distance and direction between the user and the robotic device;

receiving, by the robotic device, a second signal from the positioning hardware device that is worn by the user, wherein the second signal indicates that the user is pointing at a user-selected object, wherein the second signal comprises a description of a horizontal angle formed by a first line between the user and the robotic device and a second line between the user and the user-selected object while the user is pointing at the user-selected object, and wherein the second signal further comprises a description of a vertical spatial inclination of the positioning hardware device while the user is pointing at the user-selected object;

determining an identification and location of the user-selected object based on the first signal, the second signal, and a record of object positions of objects within a predefined area of the user;

determining a direction and distance from the robotic device to the user-selected object, wherein the direction and distance from the robotic device to the user-selected object is derived from the first signal, the second signal, and the record of object positions of objects within a predefined area of the user;

determining whether the robotic device is authorized to perform a specific task on the user-selected object; and in response to determining that the robotic device is authorized to perform the specific task on the user-selected object, traversing, by the robotic device, the direction and distance from the robotic device to the user-selected object and performing, by the robotic device, the specific task on the user-selected object.

9. The computer program product of claim 8, wherein said determining whether the robotic device is authorized to perform the specific task on the user-selected object comprises:

examining a record of tasks that have been performed on the user-selected object, wherein the record of tasks comprises a record of when the specific task was last performed on the user-selected object; and in response to said examining determining that the specific task was last performed on the user-selected object more than a predefined past length of time, determining that the robotic device is authorized to perform the specific task on the user-selected object.

10. The computer program product of claim 8, wherein said determining whether the robotic device is authorized to perform the specific task on the user-selected object comprises:

examining a record of tasks that have been performed on the user-selected object, wherein the record of tasks comprises a record of which tasks have been performed by the robotic device on the user-selected object; and in response to said examining determining that the robotic device has performed the specific task on the user-selected object at a past time, determining that the robotic device is authorized to perform the specific task on the user-selected object.

11. The computer program product of claim 8, wherein said determining whether the robotic device is authorized to perform the specific task on the user-selected object comprises:

examining a record of object locations of objects that have been acted upon by the robotic device at a past time; and in response to said examining determining that the robotic device has performed the specific task on an object at a particular object location from the record of object locations of objects that have been acted upon by the robotic device at the past time, determining that the robotic device is authorized to perform the specific task on the user-selected object at the particular object location.

12. The computer program product of claim 8, wherein said determining whether the robotic device is authorized to perform the specific task on the user-selected object comprises:
   examining a record of object locations of objects that have been acted upon by the robotic device at a past time, wherein the record of object locations further comprises a type description of at least one of the objects;
   matching the user-selected object to a particular object from the record to determine a type description of the user-selected object; and
   in response to the type description of the user-selected object matching a type description of an object from the record of object locations, determining that the robotic device is authorized to perform the specific task on the user-selected object.

13. The computer program product of claim 8, wherein the method further comprises:
   receiving, by the robotic device, an area signal that is generated by movement of the positioning hardware device that is worn by the user, wherein the area signal describes a definition of an area that extends around a space occupied by the user-selected object, wherein the area is populated with the user-selected object and objects other than the user-selected object; and
   executing, by the robotic device, the specific task on any object within the area that extends around the space occupied by the user-selected object.

\* \* \* \* \*